US006618265B2

(12) United States Patent
Chang et al.

(10) Patent No.: US 6,618,265 B2
(45) Date of Patent: Sep. 9, 2003

(54) WIRING ARRANGEMENT ENSURING ALL-OR-NONE OPERATION OF A SERIES OF MODULAR LOAD ELEMENTS

(75) Inventors: Fong M. Chang, Los Gatos, CA (US); Yu Chang, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/969,202

(22) Filed: Oct. 1, 2001

(65) Prior Publication Data

US 2003/0063446 A1 Apr. 3, 2003

(51) Int. Cl.[7] .............................. H05K 7/02; H05K 7/06; H05K 7/08; H05K 7/10
(52) U.S. Cl. ..................... 361/760; 361/775; 361/823; 361/828; 307/12; 307/29
(58) Field of Search ................. 361/760, 775, 361/823–825; 307/10–12, 16, 29, 38, 42, 50–52, 77

(56) References Cited

U.S. PATENT DOCUMENTS

| 5,216,285 | A | * | 6/1993 | Hilsenteger et al. | ......... 307/12 |
| 5,581,130 | A | * | 12/1996 | Boucheron | ................. 307/10.1 |
| 5,640,055 | A | * | 6/1997 | Sugiyama et al. | ......... 307/10.1 |
| 5,659,206 | A | * | 8/1997 | Taguchi et al. | ................ 307/11 |
| 6,268,559 | B1 | * | 7/2001 | Yamawaki | .................. 136/244 |
| 6,472,770 | B1 | * | 10/2002 | Pohjola | ...................... 307/10.1 |
| 6,489,693 | B1 | * | 12/2002 | Hetzler | ...................... 307/10.1 |
| 6,492,745 | B1 | * | 12/2002 | Colley et al. | .................. 307/66 |
| 6,528,899 | B1 | * | 3/2003 | Saito et al. | ................ 307/10.1 |

FOREIGN PATENT DOCUMENTS

| DE | 3905772 C1 | 9/1990 |
| DE | 4012307 A1 | 10/1991 |

* cited by examiner

*Primary Examiner*—Kamand Cuneo
*Assistant Examiner*—Tuan Dinh
(74) *Attorney, Agent, or Firm*—Townsend & Townsend & Crew

(57) ABSTRACT

All-or-none operation of a series of modular load elements is ensured by routing high and low voltage lines from a power source through opposite nodes positioned at either end of the series of load elements. This arrangement prevents activation of only a portion of the load elements where electrical connection between them is not successfully established.

8 Claims, 1 Drawing Sheet

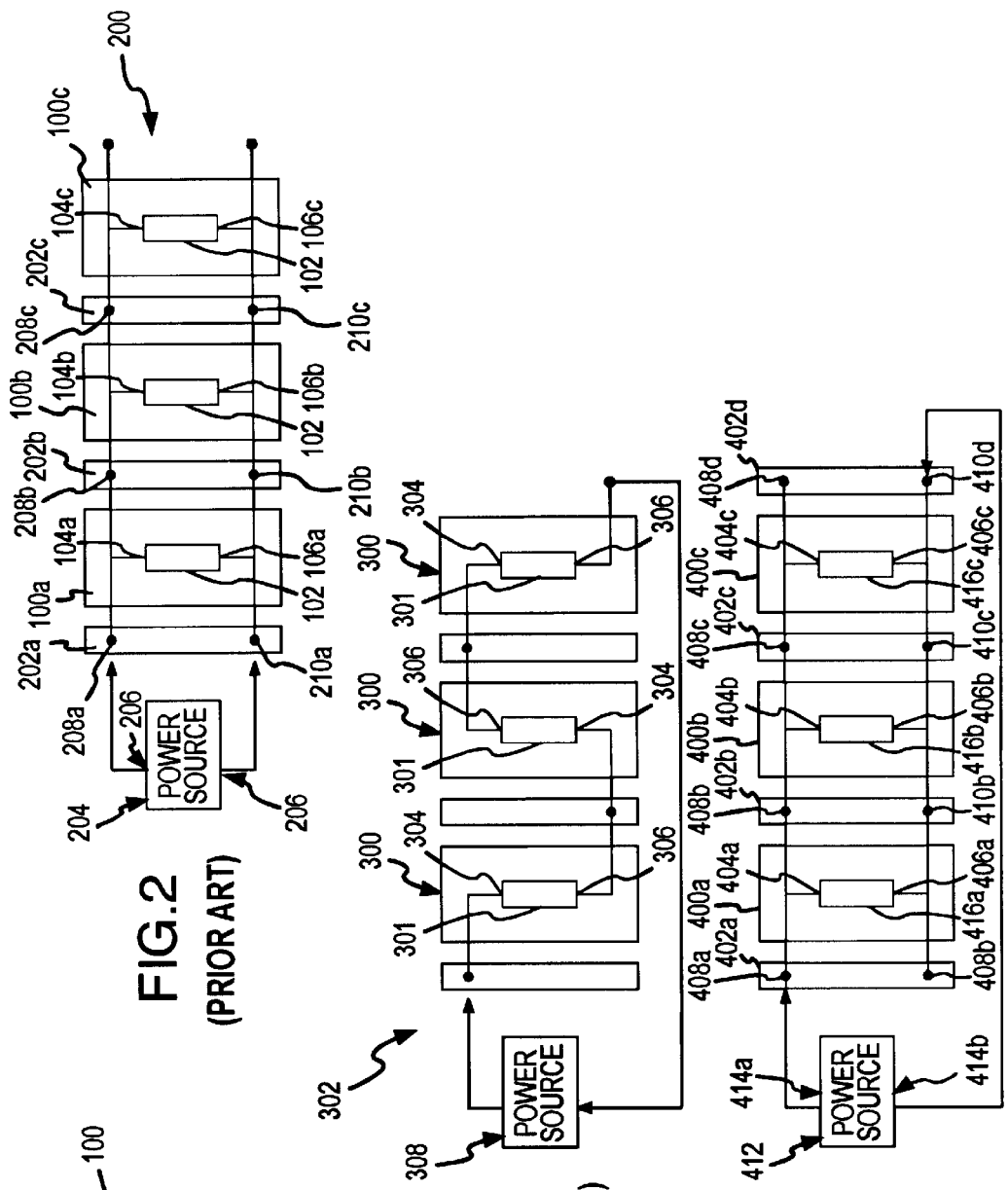

US 6,618,265 B2

WIRING ARRANGEMENT ENSURING ALL-OR-NONE OPERATION OF A SERIES OF MODULAR LOAD ELEMENTS

BACKGROUND OF THE INVENTION

FIG. 1 shows a schematic view of a conventional modular load element of an electrical device. Modular load element 100 comprises load element 102 having first node 104 and second node 106. Application of a potential difference across nodes 104 and 106 creates a circuit and allows load element 102 to perform a useful function. Examples of load elements include heaters, motors, actuators, as well as any other devices that operate through receipt of an electrical signal.

It is frequently desired that a plurality of modular load elements function together. One conventional arrangement of modular load elements is illustrated in FIG. 2. Specifically, series 200 of modular load elements 100 are in electrical communication with power source 204 via connector structures 202a–c. Specifically, terminals 206 of power source 204 are in respective communication with terminals 208a and 210a of first connector structure 202a. Terminals 208a and 210a of first connector structure 202a are in turn in communication with first and second nodes 104a and 106a respectively, of first load element 100a, and with terminals 208b and 210b of second connector structure 202b. Terminals 208b and 210b of second connector structure 202b are in turn in communication with first and second nodes 104b and 106b respectively, of second load element 100b and with terminals 208c and 210c of third connector structure 202c. Terminals 208c and 210c of third connector structure are in turn in communication with first and second nodes 104c and 106c of third load element 100c.

The modular load elements of FIG. 2 are connected in parallel. That is, failure to successfully connect the first modular load element of the series to the second modular load element does not prevent operation of the first modular load element. Such problems in establishing electrical communication between the modular load elements may occur where the connector structures are small and difficult to manipulate owing to their positioning within a larger apparatus.

The conventional parallel arrangement of the modular load elements shown in FIG. 2 is advantageous in that one connection failure will not preclude the entire series from operating. However, in certain applications, it is desirable that either all or none of the load elements operate.

For example, in semiconductor fabrication processes, wafers may be heated by a plurality of lamps arranged as a series of modular load elements. Any amount of heat received by the wafer from the lamps can result in irreversible redistribution of dopants within the wafer. Accordingly, where one or more lamps fail to light because of an unsuccessful electrical connection between them, it is desirable that none of the lamps operate. In such an event, connection between all of the lamps can ultimately be established, and the wafers successfully heated, without having to scrap partially heated wafers.

Moreover, in many applications it is necessary to continuously monitor operation of the load elements, so that corrective action can quickly and effectively be taken in the event that connection between all of a series of modular load elements is not established. Since the load elements shown in FIG. 2 receive power independent of each other, each load element requires a separate sensor in order to detect its operation. The provision of multiple sensors to the apparatus adds complexity and expense.

One possible approach to arranging a plurality of load elements to ensure all-or-none operation is shown in FIG. 3. Modular load elements 300 of system 302 of FIG. 3 are arranged serially, with the second node 306 of each load element 301 in communication with first node 304 of the succeeding load element, and the second node of the final modular load element in the series connected with the power source. Failure to properly connect modular load elements 300 will prevent all from operating, as the circuit will remain open.

However, the approach of FIG. 3 requires complex design of the load elements, as each load element must account for differences in voltage and current resulting from operation of the preceding load elements in the series. Moreover, where power source 308 provides alternating current to the circuit, the first and second nodes of the devices will shift continuously over time, rendering compensation for cumulative voltage/current effects difficult or impossible.

Accordingly, new arrangements of a plurality of modular load elements are desirable.

SUMMARY OF THE INVENTION

Embodiments of circuits and methods in accordance with the present invention ensure all-or-none operation of a series of modular load elements. High and low voltage lines from a power source are routed through respective load element nodes positioned at opposite ends of the series of modular load elements. This arrangement prevents activation of only a portion of the load elements where electrical connection between each of them has not been successfully established.

An embodiment of a circuit in accordance with the present invention comprises a power source having a first terminal and a second terminal, a first modular load element having a first node and a second node, and a final modular load element having a first node and a second node. A first connector includes a first terminal in communication with the first terminal of the power source and with the first node of the first modular load element, and a second terminal in communication with the second node of the first modular load element. A second connector includes a first terminal in communication with the first node of the first modular load element and with the first node of the final modular load element, and a second terminal in communication with the second node of the first modular load element and with the second node of the final modular load element. A third connector includes a first terminal in communication with the first node of the final modular load element, and a second terminal in communication with the second node of the final modular load element and with the second node of the power source. Failure to establish electrical connection between the power source and at least one of the first and final modular load elements prevents operation of either of the first and final modular load elements.

An embodiment of a method of arranging a series of modular load elements in communication with a common power source comprises connecting a first node of a first modular load element of the series with a first terminal of the power source. A first node of a final load element of the series is placed in electrical communication with the first node of the first modular load element. A second node of a final load element of the series is connected with a second terminal of the power source. A second node of the first modular load element is placed in electrical communication with the second node of the final modular load element of the series, such that failure to establish a connection between any of the load elements of the series precludes all of the load elements of the series from experiencing a potential difference.

BRIEF DESCRIPTION OF THE DRAWINGS

FIG. 1 shows a schematic view of a conventional modular load element of an electrical device.

FIG. 2 shows a schematic view of a conventional circuit bearing a series of modular load elements in parallel connection.

FIG. 3 shows a schematic view of a circuit bearing a series of modular load elements in serial connection.

FIG. 4 shows a schematic view of one embodiment of a circuit in accordance with the present invention.

DESCRIPTION OF THE SPECIFIC EMBODIMENTS

Embodiments of circuits and methods in accordance with the present invention ensure all-or-none operation of a series of modular load elements. High and low voltage lines from a power source are routed through respective load element nodes positioned at opposite ends of the series. This arrangement prevents activation of only a portion of the load elements where electrical connection between each of them has not been successfully established.

FIG. 4 shows one embodiment of a circuit in accordance with the present invention. Specifically, series 400 of modular load elements 400a–c of the circuit of FIG. 4 are connected with power source 412 through connector structures 402a–d. First terminal 408a of first connector structure 402a is in communication with first terminal 414a of power source 412 and with first node 404a of first modular load element 400a. Connector structures 402a, 402b and 402c enable first nodes 404a–c of successive load elements 416a–c to also be in communication with first terminal 414a of power source 412.

Unlike the conventional parallel arrangement of modular load elements shown in FIG. 2 however, second terminal 414b of power source 412 is in communication with second terminal 410d of end connector structure 402d. Second terminal 408d of end connector 402d is in turn in communication with second nodes 406a–c of successive load elements 416a–c.

In the event that connection between any of modular load elements 400a–c of series 401 is unsuccessful, none of the modular load elements will function. Specifically, the low voltage signal from the circuit will be blocked from returning to power source 412. The circuit will remain open and no current will flow. This result is achieved by routing lines from the high and low voltage terminals, respectively, of the power source through opposite ends of the series of modular load elements. As a result, connection must be successfully established between each modular load element before a closed circuit can be achieved.

Embodiments of apparatuses and methods in accordance with the present invention are applicable to the arrangement of any group of modular load elements in communication with a common power source. Examples of possible load elements connected in accordance with embodiments of the present invention include, but are not limited to resistors, capacitors, heaters, motors, and actuators. In one embodiment, heat lamps of a semiconductor processing tool may serve as the series of modular load elements. In an alternative embodiment, heaters positioned proximate to a foreline of a semiconductor processing chamber may serve as the series of modular load elements.

Moreover, while the invention has been illustrated with an embodiment featuring a series of three successive modular load elements, the invention is not limited to this or any particular number of load elements. Embodiments of circuits and methods of arranging modular load elements can include as few as two modular load elements, and no upper limit of load elements, and remain within the scope of the present invention.

In addition, a series of modular load elements may receive power from either an AC or DC power source, and the embodiment would remain within the scope of the present invention. Where the circuit is connected to an AC power source, the location of the high and low voltage terminals would continuously alternate over time, but would always be communicated to the modular load elements through nodes positioned at opposite ends of the series.

One benefit achieved by embodiments of circuits and methods in accordance with the present invention is the ability to monitor operation utilizing only one sensor. Specifically, because operation of the modular load elements in unison is assured by the present invention, only a single detector is required to verify circuit activity. This eliminates the redundant sensors required to monitor operation of each of the modular load elements of the conventional circuit, reducing complexity and lowering price.

Given the above detailed description of the present invention and the variety of embodiments described therein, these equivalents and alternatives along with the understood obvious changes and modifications are intended to be included within the scope of the present invention.

What is claimed is:

1. A circuit comprising:
   a power source having a first terminal and a second terminal;
   a first modular load element having a first node and a second node;
   a final modular load element having a first node and a second node;
   a first connector including,
      a first terminal in communication with the first terminal of the power source and with the first node of the first modular load element, and
      a second terminal in communication with the second node of the first modular load element;
   a second connector including,
      a first terminal in communication with the first node of the first modular load element and with the first node of the final modular load element, and
      a second terminal in communication with the second node of the first modular load element and with the second node of the final modular load element; and
   a third connector including,
      a first terminal in communication with the first node of the final modular load element, and
      a second terminal in communication with the second node of the final modular load element and with the second node of the power source,
   wherein failure to establish electrical connection between the power source and at least one of the first and final modular load elements prevents operation of either of the first and final modular load elements.

2. The circuit of claim 1 wherein the power source is a DC power source and the first terminal of the power source is a high voltage terminal and the second terminal of the power source is a low voltage terminal.

3. The circuit of claim 1 wherein the power source is a DC power source and the second terminal of the power source is a low voltage terminal and the second terminal of the power source is a high voltage terminal.

4. The circuit of claim 1 wherein the power source is an AC power source such that the first terminal of the first connector and the second terminal of the third connector are alternately in communication with a low voltage terminal and a high voltage terminal respectively, of the power source.

5. The circuit of claim 1 further comprising an intervening modular load element positioned between the first modular load element and the final modular load element, wherein a first node of the intervening modular load element is in electrical communication with the first terminal of the first connector, and a second node of the intervening modular load element is in electrical communication with the second terminal of the third connector.

6. The circuit of claim 1 wherein the modular load elements comprise lamps of a semiconductor processing chamber.

7. The circuit of claim 1 wherein the modular load elements comprise heaters in a foreline of a semiconductor processing chamber.

8. The circuit of claim 1 further comprising a single sensor configured to detect activation or nonactivation of all of the modular load elements.

* * * * *